United States Patent
Mori et al.

(10) Patent No.: US 8,193,782 B2
(45) Date of Patent: Jun. 5, 2012

(54) ABNORMALITY DETECTION APPARATUS

(75) Inventors: Hitoshi Mori, Anjo (JP); Toshinori Maruyama, Anjo (JP)

(73) Assignee: Denso Corporation, Kariya (JP)

( * ) Notice: Subject to any disclaimer, the term of this patent is extended or adjusted under 35 U.S.C. 154(b) by 594 days.

(21) Appl. No.: 12/320,178

(22) Filed: Jan. 21, 2009

(65) Prior Publication Data

US 2009/0206802 A1 Aug. 20, 2009

(30) Foreign Application Priority Data

Feb. 19, 2008 (JP) ................... 2008-037191

(51) Int. Cl.
*H02K 11/00* (2006.01)
*H02P 9/00* (2006.01)
*H02H 7/06* (2006.01)

(52) U.S. Cl. ............... 322/33; 322/24; 322/28; 322/34; 322/44; 322/59; 322/99; 310/68 C; 374/56; 374/132

(58) Field of Classification Search ............. 322/33, 322/34, 99, 24, 28, 44, 59; 374/56, 132; 307/10.1; 290/40 B; *H02K 11/00; H02P 9/00, H02P 11/00; H02H 7/06*
See application file for complete search history.

(56) References Cited

U.S. PATENT DOCUMENTS

| | | | | |
|---|---|---|---|---|
| 4,602,872 A * | 7/1986 | Emery et al. | .................. | 374/152 |
| 6,809,428 B1 * | 10/2004 | Blackburn et al. | .......... | 290/37 R |
| 7,116,081 B2 * | 10/2006 | Wilson | ............................. | 322/33 |
| 7,199,559 B2 * | 4/2007 | Yanagi | ............................. | 322/33 |
| 7,288,922 B2 * | 10/2007 | Maehara et al. | ................ | 322/33 |
| 7,538,523 B2 * | 5/2009 | Kitamura et al. | ............... | 322/33 |
| 2001/0035688 A1 * | 11/2001 | Sawada et al. | .............. | 310/68 C |
| 2005/0258807 A1 * | 11/2005 | Yanagi | ............................. | 322/33 |
| 2006/0238172 A1 * | 10/2006 | Maehara et al. | ................ | 322/33 |
| 2007/0268003 A1 * | 11/2007 | Kolomeitsev et al. | .......... | 322/33 |
| 2009/0206802 A1 * | 8/2009 | Mori et al. | ..................... | 322/99 |

FOREIGN PATENT DOCUMENTS

JP A-2005-102436 4/2005

* cited by examiner

*Primary Examiner* — John K Kim
(74) *Attorney, Agent, or Firm* — Oliff & Berridge, PLC

(57) ABSTRACT

The abnormality detection apparatus includes a first function of measuring a first temperature of a first portion of the abnormality detection apparatus, the first temperature having a correlation with a second temperature of a second portion of a vehicle alternator, a second function of integrating a stress depending on a temperature variation of the first portion on the basis of the first temperature measured by the first function, a third function of predicting occurrence of abnormality in the second portion depending on the stress integrated by the second function, and a fourth function of issuing an alarm when the third function predicts occurrence of abnormality.

4 Claims, 2 Drawing Sheets

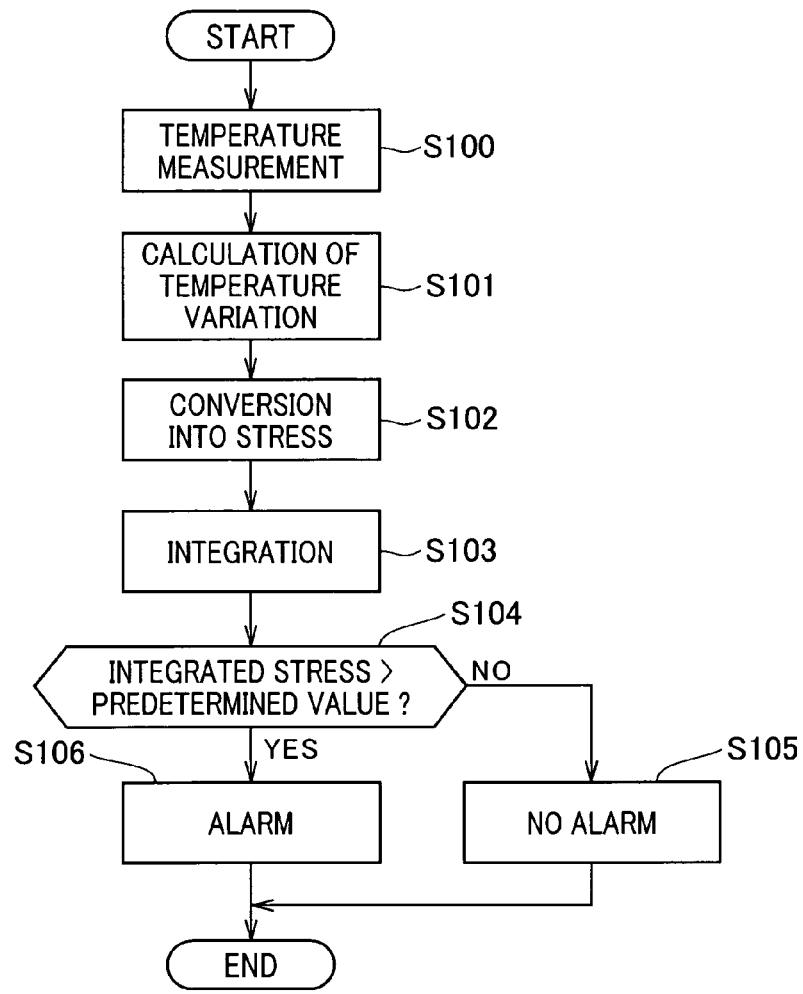
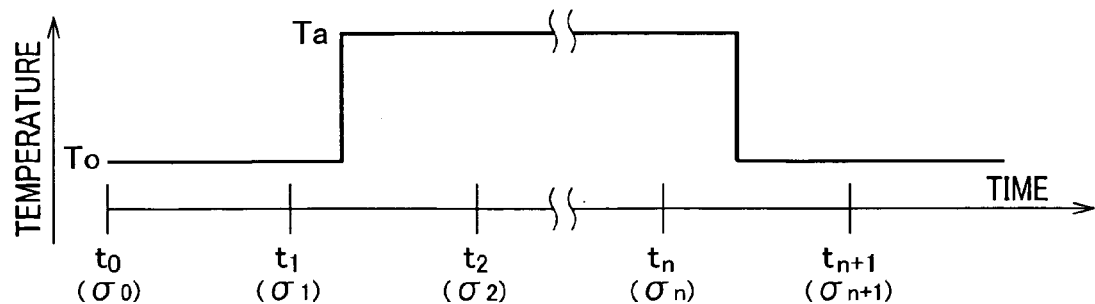

ABNORMALITY DETECTION APPARATUS

CROSS-REFERENCE TO RELATED APPLICATION

This application is related to Japanese Patent Application No. 2008-37191 filed on Feb. 19, 2008, the contents of which are hereby incorporated by reference.

BACKGROUND OF THE INVENTION

1. Field of the Invention

The present invention relates to an abnormality detection apparatus for predicting occurrence of abnormality in a vehicle alternator and outputting an alarm signal when necessary.

2. Description of Related Art

There is known an abnormality detection apparatus configured to detect an abnormality of a vehicle alternator on the basis of an output voltage of the vehicle alternator. For example, refer to Japanese Patent Application Laid-open No. 2005-102436. This abnormality detection apparatus filters an output voltage of the vehicle alternator by a filter having a predetermined pass band, and determines that there is abnormality in the vehicle alternator if the difference between a maximum and a minimum of the filtered output voltage exceeds a predetermined value.

However, although the above abnormality detection apparatus can detect occurrence of an abnormality in the vehicle alternator, it cannot predict occurrence of an abnormality in the vehicle alternator, and issue an alarm signal if necessary.

In recent years, a growing number of vehicles are provided with an engine auto start/stop function enabling, for example, to stop and restart a vehicle engine automatically at an intersection. In such vehicles, a rectifier device (particularly, soldered portions of rectifying elements) of a vehicle alternator tends to malfunction due to thermal fatigue with higher frequency compared to vehicles not provided with the auto start/stop function, because electrical loads are turned on and off more frequently when the auto start/stop function is provided than when it is not provided. If it is possible to issue an alarm before an abnormality due to accumulation of thermal fatigue occurs, parts which are going to malfunction can be replaced before they stop functioning.

SUMMARY OF THE INVENTION

The present invention provides an abnormality detection apparatus comprising:

a first function of measuring a first temperature of a first portion of the abnormality detection apparatus, the first temperature having a correlation with a second temperature of a second portion of a vehicle alternator;

a second function of integrating a stress depending on a temperature variation of the first portion on the basis of the first temperature measured by the first function;

a third function of predicting occurrence of abnormality in the second portion depending on the stress integrated by the second function; and a fourth function of issuing an alarm when the third function predicts occurrence of abnormality.

According to the present invention, there is provided an abnormality detection apparatus capable of predicting occurrence of abnormality in a vehicle alternator due to thermal fatigue and issuing an alarm before it actually occurs.

Other advantages and features of the invention will become apparent from the following description including the drawings and claims.

BRIEF DESCRIPTION OF THE DRAWINGS

In the accompanying drawings:

FIG. 2 is a flowchart showing steps of an operation related to generating and outputting an abnormality prediction signal performed by the vehicle alternator control apparatus; and FIG. 3 is a diagram showing an example of variations of the temperature measured by a temperature measuring section included in the vehicle alternator control apparatus.

PREFERRED EMBODIMENTS OF THE INVENTION

Figure 1:
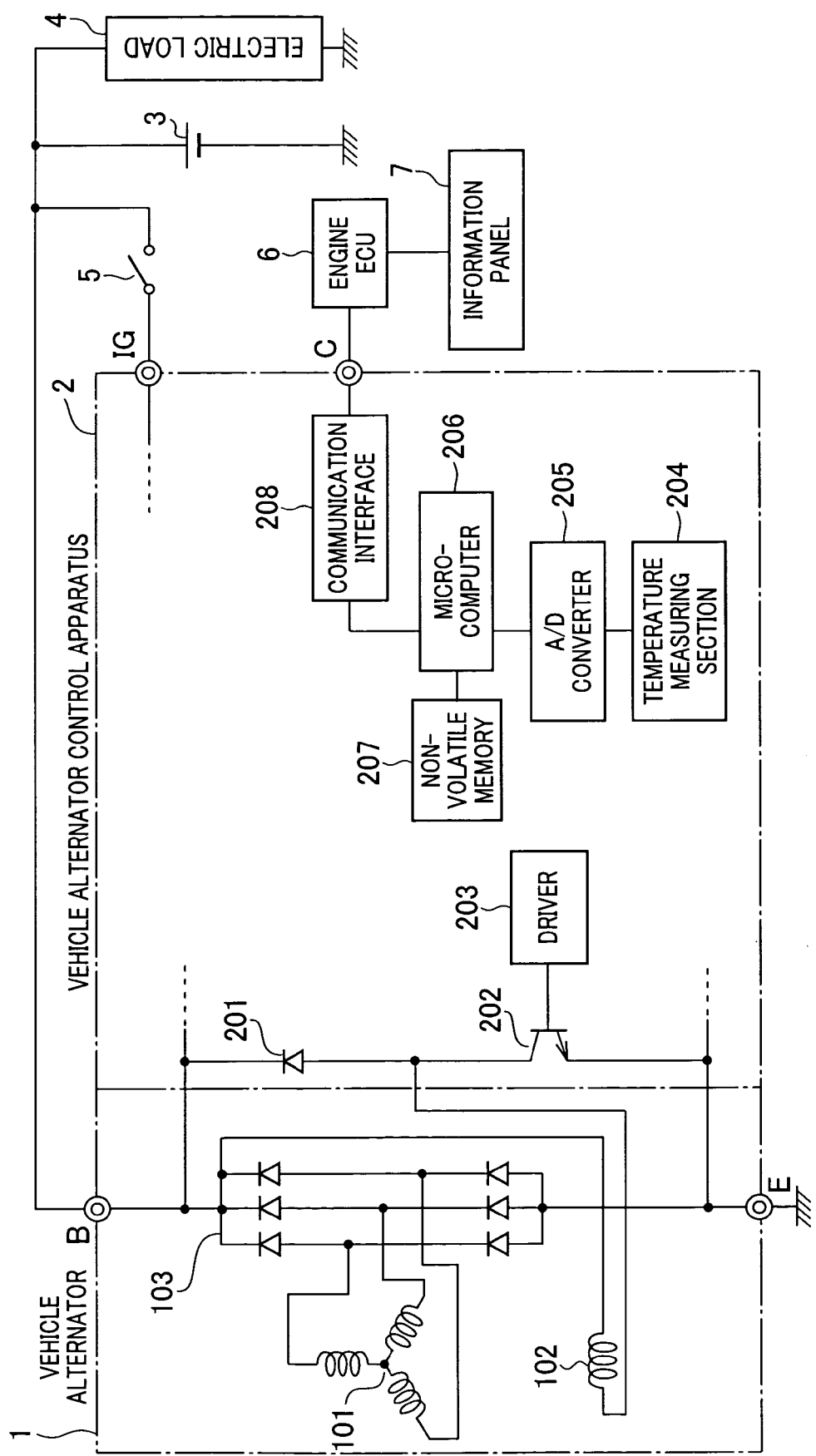
FIG. 1 is a diagram showing structures of a vehicle alternator and a vehicle alternator control apparatus including an abnormality detection apparatus according to an embodiment of the invention.

FIG. 1 is a diagram showing structures of a vehicle alternator 1 and a vehicle alternator control apparatus 2 including an abnormality detection apparatus according to an embodiment of the invention.

The vehicle alternator control apparatus 2 controls a voltage at an output terminal (B-terminal) of the vehicle alternator 1 to be kept at a predetermined target regulation voltage. The vehicle alternator 1 is constituted by a stator around which a three-phase armature winding 101 is wound, a rotor around which an excitation winding 102 is wound, and a rectifier device 103 for full-wave rectifying the three-phase output of the armature winding 101. The output voltage of the vehicle alternator 1 is controlled by on/off control of passage of an excitation current to the excitation winding 102 after a key switch is turned on to power on the vehicle alternator control apparatus 2. The B-terminal of the vehicle alternator 1 is connected to a battery 3 and an electrical load 4 to supply them with a charging current or operating current. The vehicle alternator control apparatus 2 is connected to an engine ECU 6 through a communication terminal C thereof. The engine ECU 6 displays an alarm on an information panel 7 when it receives an abnormality prediction signal sent from the vehicle alternator control apparatus 2. The alarm may be made by lighting an indicator included in the information panel 7.

Next, the detailed structure and operation of the vehicle alternator control apparatus 2 are explained. As shown in FIG. 1, the vehicle alternator control apparatus 2 includes a flywheel diode 201, an excitation drive transistor 202, a driver 203, a temperature measuring section 204, an A/D converter 205, a microcomputer 206, a non-volatile memory 207, and a communication interface 208.

The excitation drive transistor 202, which is series-connected to the excitation winding 102, serves as a switching element which passes the excitation current to the excitation winding 102 when it is turned on by a drive signal applied thereto. The flywheel diode 201, which is parallel-connected to the excitation winding 102, reduces a surge current occurring when the excitation drive transistor 202 is turned off. The driver 203 on/off controls the excitation drive transistor 202 by applying the drive signal to the excitation drive transistor 202.

The temperature measuring section 204 is included in the vehicle alternator control apparatus 2 to measure the temperature where it is installed. In more detail, the vehicle alternator control apparatus 2 is located at a position adjacent to the rectifier device 103, and the temperature measuring section 204 is located in the vicinity of the rectifier device 103. Accordingly, there is a correlation between the temperature measured by the temperature measuring section 204 and the temperature of the rectifier device 103. The temperature measuring section 204 outputs a voltage indicative of the measured temperature. The A/D converter 205 converts the voltage outputted from the temperature measuring section 204 into digital temperature data.

The microcomputer 206 calculates a temperature variation on the basis of the digital temperature data outputted from the A/D converter 205, converts the calculated temperature variation into a stress, and performs an integrating process on the stress. The result of the integrating process is stored in the non-volatile memory 207. The microcomputer 206 calculates the probability of occurrence of an abnormality due to thermal fatigue of the rectifier device 103 on the basis of the integrated value of the stress, and if the calculated probability exceeds a predetermined value, outputs an abnormality prediction signal. The communication interface 208 transmits the abnormality prediction signal outputted from the microcomputer 206 to the engine ECU 6 through the communication terminal C.

Next, an operation related to generating and outputting the abnormality prediction signal performed by the vehicle alternator control apparatus 2 having the above described structure is explained. FIG. 2 is a flowchart showing steps of this operation performed at regular time intervals.

Each time the temperature measuring section 204 measures the temperature at step S100, the microcomputer 206 calculates a temperature variation on the basis of the measured temperature at step 101. Subsequently, the microcomputer 206 converts the calculated temperature variation into a stress at step S102, and then updates an integrated value of the stress, that is, updates the stress which has been integrated until previous time and stored in the non-volatile memory 207, by adding the stress obtained this time to this integrated value.

Thereafter, the microcomputer 206 determines whether or not the newly updated integrated value exceeds a predetermined value at step S104. If the determination result at step S104 is negative, the microcomputer 206 does not output the abnormality prediction signal, and accordingly, the engine ECU 6 does not perform an alarm operation (step S105). On the other hand, if the determination result at step S104 is affirmative, the microcomputer 206 outputs the abnormality prediction signal, and accordingly, the engine ECU 6 performs an alarm operation (step S106).

FIG. 3 is a diagram showing an example of temperature variations. In FIG. 3, the reference symbols $t_0, t_1, t_2, \ldots, t_n$ on the horizontal axis representing elapsed time indicate timings at which temperature measurement is performed at step S100 shown in FIG. 2. The vertical axis in FIG. 3 represents the measured temperature. In the example shown in FIG. 3, the temperature increases from $T_0$ to $T_a$ during a period from $t_1$ to $t_2$, the condition of the temperature being $T_a$ continues over a period from $t_n$ to $t_{n+1}$, and thereafter the temperature decreases to $T_0$.

The relationship between the temperature variation and the stress, and when creep occurs in the soldered portions of the rectifier device depend on solder material and structure of the rectifier device. However, to simply explain, it is assumed that the stress is in direct proportion to the temperature variation, and in inverse proportion to duration of action in the following description.

In this example, the integrated stress $\Sigma\sigma$ is 0 at each of the timings $t_0$ and $t_1$, because the temperature variation $\Delta T$ is 0 at each of these timings, and accordingly the stresses $\sigma_0$ and $\sigma_1$ at these timings are also 0. At the timing $t_2$, the stress $\sigma_2$ becomes equal to $A \times |T_a - T_0|/B$, because the temperature variation $\Delta T$ is equal to $T_a - T_0$ at this timing. Here, A is a direct proportionality constant between the stress and temperature variation, and B is an inverse proportionality constant between the stress and duration of action. In this way, the following holds.

$$\text{At timing } t_0, \sigma_0 = 0, \sum \sigma = 0$$

$$\text{At timing } t_1, \sigma_1 = 0, \sum \sigma = 0$$

$$\text{At timing } t_2, \sigma_2 = A \times |T_a - T_0|$$

$$\sum \sigma = A \times |T_a - T_0|$$

$$\text{At timing } t_3, \sigma_3 = A \times |T_a - T_0|$$

$$\sum \sigma = A \times |T_a - T_0| + A \times |T_a - T_0|/B$$

$$\text{At timing } t_4, \sigma_4 = A \times |T_a - T_0|/B$$

$$\sum \sigma = A \times |T_a - T_0| + A \times |T_a - T_0|/B + A \times |T_a - T_0|/B^2$$

$$\text{At timing } t_n, \sigma_n = A \times |T_a - T_0|/B^{(n-2)}$$

$$\sum \sigma = A \times |T_a - T_0| + A \times |T_a - T_0|/B + A \times |T_a - T_0|/B^2 + \ldots + A \times |T_a - T_0|/B^{(n-2)}$$

$$\text{At timing } t_{n+1}, \sigma_{n+1} = A \times |T_a - T_0|/B$$

$$\sum \sigma = A \times |T_a - T_0| + A \times |T_a - T_0|/B + A \times |T_a - T_0|/B^2 + \ldots + A \times |T_a - T_0|/B^{(n-2)} + A \times |T_a - T_0|/B$$

The integrated stress $\Sigma\sigma$ is calculated in each timing in accordance with the above expressions, and if the integrated stress $\Sigma\sigma$ is detected to exceed a predetermined value, the microcomputer 206 outputs the abnormality prediction signal, and in response to this signal, the engine ECU 6 issues an alarm.

The thermal fatigue of the soldered portions of the rectifier device 103 becomes large as the temperature variation increases or the period over which they are exposed to the temperature variation increases. Accordingly, by integrating the stress having a correlation with the temperature variation, it is possible to estimate the degree of the thermal fatigue of the soldered portions of rectifier device 103 and to issue an alarm before abnormality occurs.

In this embodiment, since the prediction of occurrence of abnormality is made on the basis of the result of comparison between the integrated stress and a predetermined value, the load required for the prediction process can be made small.

Furthermore, since the vehicle alternator 1 includes the vehicle alternator control apparatus 2 for controlling the power generating state of the vehicle alternator 1, and the vehicle alternator control apparatus 2 is provided with the temperature measuring section 204, A/D converter 205, microcomputer 206, and non-volatile memory 207, it is possible for the vehicle alternator control apparatus 2 to perform all of the process from temperature measurement to abnormality prediction, and also to simplify the wiring for the alarm prediction.

It is a matter of course that various modifications can be made to the above embodiment as described below. Although it is assumed that the stress is in direct proportion to the temperature variation and in inverse proportion to duration of action in the above embodiment, if the relationship between the temperature variation and the stress is known in detail, and can be represented in some form of data, such as a map, a table or mathematical expressions, the stress may be determined with reference to such data.

In the above embodiment, although the temperature measuring section 204, A/D converter 205, microcomputer 206, and non-volatile memory 207 are provided in the vehicle alternator control apparatus 2, these components or equivalent functions may be provided in the engine ECU 6.

In the above embodiment, although the temperature measuring section 204 is provided in the vehicle alternator control apparatus 2, at least a temperature sensing portion of the temperature measuring section 204 may be disposed in contact with or in the vicinity of the rectifier device 103, so that the temperature of the rectifier device 103 can be measured more accurately.

The above embodiment is configured to transmit the abnormality prediction signal from the vehicle alternator control apparatus 2 to the engine ECU 6 so that the engine ECU 6 issues an alarm in response to the abnormality prediction signal. However, the above embodiment may be modified so that the vehicle alternator control apparatus 2 directly instructs the information panel 7 to issue an alarm.

The above embodiment is configured to predict occurrence of abnormality in view of thermal fatigue of the soldered portions of the rectifier device 103. However, occurrence of abnormality may be predicted in view of thermal fatigue of an appropriate portion of the vehicle alternator 1 other than the rectifier device 103.

The above explained preferred embodiments are exemplary of the invention of the present application which is described solely by the claims appended below. It should be understood that modifications of the preferred embodiments may be made as would occur to one of skill in the art.

What is claimed is:

1. An abnormality detection apparatus comprising:
    a first function of measuring a first temperature of a first portion of said abnormality detection apparatus, said first temperature having a correlation with a second temperature of a second portion of a vehicle alternator;
    a second function of summing up a stress depending on a temperature variation of said first portion on the basis of said first temperature measured by said first function at each time intervals;
    a third function of predicting an occurrence of an abnormality in said second portion depending on said stress summed up by said second function; and
    a fourth function of issuing an alarm when said third function predicts the occurrence of the abnormality.

2. The abnormality detection apparatus according to claim 1, wherein said third function predicts the occurrence of the abnormality in said second portion if said stress summed up by said second function exceeds a predetermined value.

3. The abnormality detection apparatus according to claim 1, wherein said second portion is a rectifier device included in said vehicle alternator.

4. The abnormality detection apparatus according to claim 1, wherein said vehicle alternator includes a vehicle alternator control apparatus for controlling a power generating state of said vehicle alternator, and said first to third functions are provided in said vehicle alternator control apparatus.

* * * * *